Oct. 20, 1959     A. M. TREYER     2,909,027
TEXTILE SPINDLE
Filed March 7, 1958
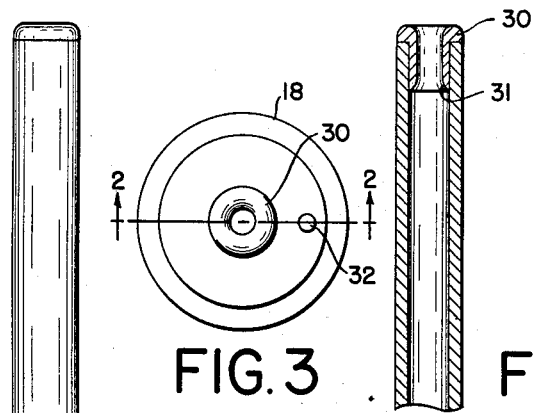
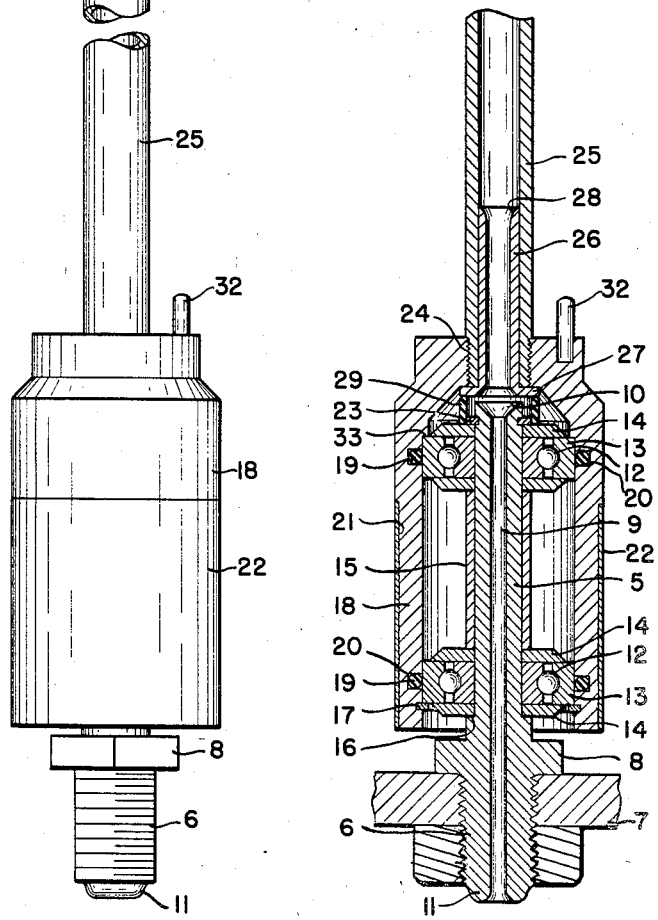
INVENTOR.
ANDRE M. TREYER
BY *James N. Ryles*
ATTORNEY

United States Patent Office 2,909,027
Patented Oct. 20, 1959

2,909,027

TEXTILE SPINDLE

Andre Marul Treyer, Hollywood, Fla.

Application March 7, 1958, Serial No. 719,950

1 Claim. (Cl. 57—130)

This invention relates to a hollow textile spindle for use in textile machines for winding multiple threads or yarn together.

The invention contemplates a spindle that is adapted to be supported upon a conventional spindle bracket and to be driven at a relatively high speed for winding the threads. The spindle of the present invention embodies a hollow tubular support for a conventional bobbin and with the support being carried and rotated by a cylindrical drum that is supported upon a pair of bearings in a manner whereby they substantially perfectly balance the spindle and the drum and to avoid wobbling or chattering at high speeds and this type of construction also permits a wider spacing of the bearings to thus reduce strain on the bearings and associated mechanism.

The invention contemplates novel means for the assembly of the bearings with respect to the drum and whereby the bearings are substantially cushioned with respect to the drum and with the cushions constituting an essential and most desirable means for preventing axial movement of the drum with respect to the bearing after assembly.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

Figure 1 is a side elevation of the textile spindle constructed in accordance with the invention, Figure 2 is a vertical section through the device and upon the same plane as Figure 1 and taken on line 2—2 of Fig. 3, and Figure 3 is a top plan view thereof.

Referring specifically to the drawings, the numeral 5 designates a fixed tubular spindle support, carrying an enlarged lower threaded end 6 for threaded engagement into the conventional spring loaded arm or bracket 7 of textile machines. The support 5 is also provided with a non-cylindrical portion 8 to facilitate the tightening of the device with respect to the bracket 7. The support 5 is open throughout its length as at 9, and with the upper end being flared outwardly at 10, while the lower end is rounded at 11 and whereby threads passing through the support 9 will avoid any sharp corners that might be calculated to injure the threads during its passage therethrough.

Disposed upon the support 5, are a pair of conventional ball bearings 12 having the usual outer raceways 13 and with the bearings being normally sealed by overlying discs 14 and whereby to substantially seal the bearings with respect to their lubrication. The bearings 12 are held in spaced apart relation by a spacer sleeve 15, having a relatively snug sliding fit upon the support 5. The support 5 is further provided with a shoulder 16 constituting the limit means for the downward movement of the lower bearing 12. A split ring 17 may be employed if desired to retain the bearings within a spindle supporting drum, to be described.

Mounted for rotation upon the bearings 12, is a cylindrical drum 18, open at its bottom. The drum 18 is adapted to engage over the bearings 12 and with the outer raceways 13 having a compressive frictional contact with conventional rubber or neoprene rings 19 that are carried within inner circumferential grooves 20 formed within the drum 18 and through the medium of which the drum is frictionally held against movement in a vertical plane by the frictional contact with the rings 19. Further, the rings 19 absorb any lateral tendency for the drum to wobble or chatter. The major outer circumference of the drum is reduced at 21 for the press fit engagement of a thin steel sleeve 22. The drum 18 is preferably formed of a light weight metal, such as tempered aluminum. The bearings 12 are held against displacement from the support 5 by a lock ring 23, engaging a circumferential slot formed within the upper end of the support 5. The drum 18 is driven at relatively high speeds from a belt, not shown, that engages the sleeve 22 and whereby the sleeve constitutes the wear surface for the drum.

The upper end of the drum 18 is formed flat and axially bored and threaded at 24, for the threaded reception of a tubular bobbin support 25. The bobbin support 25 is also formed of light weight metal, such as aluminum. The lower end of the bobbin support 25 is provided with a tubular reinforcing steel liner 26, having its lower end flanged at 27. The upper end of the liner 26 is outwardly flared at 28 to avoid any sharp corners that might tend to wear or injure the threads passing therethrough. Disposed between the flange 27 and the upper seal plate 14, is a ring-like gasket 29 for preventing the seepage of lint or dust that might possibly contact the bearings. The bobbin support 25 at its upper end is provided with a tubular steel liner 30 having its lower end flared at 31, while its upper end is curved outwardly to avoid any abrupt edges and whereby the liner 30 and the liner 26 constitutes the major wear surfaces as the threads are fed through the device. A pin 32, fixedly carried by the head of the drum 18 has engagement within the lower end of a conventional bobbin that is supported upon the support 25 and whereby the bobbin rotates with the drum 18. The drum 18 and the bobbin support 25, being formed of aluminum or a similar light metal greatly reduces the weight of the device and the tendency to avoid vibration.

In assembling the device, the lower bearing 12 is first engaged with the support 5 to contact the shoulder 16. The spacer sleeve 15 is then engaged with the support 5 after which, the upper bearing 12 is engaged upon the support 5 to contact the upper end of the sleeve 15 at which time, the lock ring 23 is engaged within its groove, securely mounting the bearings with respect to the support 5 in their properly spaced relation. The bobbin support is then tightly threaded into the threaded opening 24 of the drum and the sleeve 26 pressed therein at its lower end. It will be assumed of course that the upper cap sleeve 30 has been press-fitted into the opposite end of the bobbin support 25. The rings 19 are engaged within their respective grooves 20. The gasket 29 is then disposed upon the upper seal plate 14, having definite concentric relation to the bearing and the support 5 by the lock ring 23. The drum 18 is then forced downwardly over the bearing until the raceways 13 have full contacting engagement with the rings 19. The support 5 through the medium of its threaded end 6 is then threaded into the spindle rail 7. The device is then ready for operation. The conventional drive belt is engaged with the sleeve 22 and a bobbin engaged with the bobbin support 25 and locked against rotation by the pin 32.

It will be apparent from the foregoing that a very novel form of structure has been provided for a hollow textile spindle in winding or twisting devices and embodies very desirable mountings for the bearings 12. The outer raceways have a very slight clearance with respect to the inner wall of the drum 18 and actually, the drum is supported with respect to the bearings by the cushion rings 19. Thus, vibration under high speed is reduced to a minimum and avoids to a large extent the chattering or tendency of the device to wobble upon the bearings 12 such as would be present in a drum that was mounted upon the bearings 12 in a metal to metal contact. The positioning of the drum with respect to the bearings and the rings 19 is definitely determined by the engagement of the upper raceway 13 against a circumferential shoulder 33 formed within the drum 18. The lower split ring 17 will obviously prevent the disengagement of the drum with respect to its mounting upon the bearings. The structure is light in weight, is strong, durable, economical to manufacture and highly effective as a bobbin support in textile machines. The wear upon the parts will be negligible and any replacements necessary after long usage will be relatively inexpensive. The bearings 12 have been illustrated as ball bearings of conventional construction, but it will be apparent that any other desirable bearing may be employed with equal success. Maintenance of the device is rarely required and any necessary servicing of the parts is extremely simple.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A textile spindle for twisting, spinning and winding machines, that comprises an upstanding tubular support that has connection with a rail of a textile machine, spaced apart antifriction bearings supported upon the support, a power driven drum supported upon the bearings, compressible friction rings carried by the drum and that bear upon outer raceways of the bearings and whereby the drum is frictionally and slightly yieldably connected to the bearings, the drum being axially apertured at its upper end, a tubular bobbin support fixedly engaged in the aperture to extend upwardly co-axial to the drum and with the tubular support and the bobbin support being co-axial and having communication with each other, the bobbin support being threaded into the aperture of the top of the drum, the bobbin support being open throughout its length and communicating with the interior of the drum, the bobbin support being formed of aluminum, a steel tip insert pressed into the upper end of the bobbin support and a steel reinforcing sleeve pressed into the lower end of the bobbin support, the extremeties of the tip and the sleeve being beveled, the said drum being formed of aluminum and provided upon its exterior wall with a steel wear resisting sleeve to be engaged by a driving belt, a seal ring disposed between the uppermost bearing and the lower end of the bobbin support, the said tubular support having its upper end outwardly beveled and a pin carried by the upper end of the drum for driving engagement with a bobbin supported upon the bobbin support.

References Cited in the file of this patent

UNITED STATES PATENTS

| | | |
|---|---|---|
| 621,218 | Burr | Mar. 14, 1899 |
| 2,558,210 | Egee | June 26, 1951 |
| 2,785,526 | Keith | Mar. 19, 1957 |